United States Patent Office 3,000,865
Patented Sept. 19, 1961

3,000,865
COPOLYMERS OF PROPYLENE OXIDE AND
ALKYLENE SULFIDES
Arthur E. Gurgiolo, Lake Jackson, Tex., assignor to The
Dow Chemical Company, Midland, Mich., a corporation of Delaware
No Drawing. Filed July 3, 1958, Ser. No. 746,333
10 Claims. (Cl. 260—79)

This invention relates to new copolymeric compositions of propylene oxide and alkylene sulfides and to a method for their preparation.

The novel polymeric compositions are copolymers of propylene oxide and an alkylene sulfides, such as ethylene sulfides, propylene sulfide, isobutylene sulfide, 1,2-butylene sulfide, 2,3-butylene sulfide, styrene sulfide, and mixtures thereof containing in combined form from 5 to 95 weight percent of propylene oxide and the remainder the alkylene sulfide. These copolymers are white to yellowish solid materials that have at least one and usually more of a variety of uses including the preparation of moldings, films, fibers, and in coating applications. They generally provide high strength fabricated articles that are possessed of good dielectric characteristics and a good stability to heat and light, especially the copolymers containing from 80 to 90 weight percent of propylene oxide and from 10 to 20 weight percent of the selected alkylene sulfides. They have an average molecular weight in excess of 100,000, a softening point generally above 60° C. and a melting point over 100° C. They are insoluble in and resistant to water and aqueous acids and alkalies, but are soluble in aromatic hydrocarbons and most oxygenated organic solvents.

The solid copolymers of the invention may be made by the copolymerization of propylene oxide and the selected alkylene sulfide in the presence of a ferric chloride-propylene oxide complex catalyst. This catalyst appears to be a mixture of complex salts containing ferric chloride and propylene oxide in definite molecular ratios. Analysis and conductiometric studies have tentatively identified the complexes as probably mixtures of $2 FeCl_2 \cdot C_2H_6O$, $FeCl_3 \cdot 2C_3H_6O$, and $FeCl \cdot 3C_3H_6O$. The catalyst is made by adding a limited amount of propylene oxide very gradually with agitation to a body of anhydrous ferric chloride until the vigorous exothermic reaction ceases which generally occurs when 2 to 3 moles of propylene oxide has been added per mole of ferric chloride. Further details in the preparation and purification of the catalyst are given in U.S. Patent No. 2,706,181.

In the copolymerization of the propylene oxide and the selected alkylene sulfide, the monomers and the catalyst may be simply mixed together and charged into a closed vessel and heated until the polymerization is complete. It is usually beneficial for the reaction mass to be agitated during the polymerization. The amount of catalyst that is employed is generally from 1 to 6 percent by weight, based on the weight of the reacting monomers. Preferably, an amount of catalyst of about 4 weight percent is utilized. The employment of the preferred amount of catalyst ordinarily secures optimum rates of reaction and more complete conversions of the monomers to solid copolymers.

The copolymerization may be carried out within the temperature range of about 30° to 150° C. At the lower temperatures higher yield of the solid copolymers may be realized but the polymerization time is generally longer and may often be 200 hours or more. At the high temperatures, the rate of reaction is relatively rapid and a suitable point for the termination of the reaction may be reached in less than 3 hours. However, at these high temperatures, the yield of the solid resin obtained may decrease. In order to obtain a fairly rapid rate of reaction with a suitable yield of the desired solid polymer, the copolymerization is ordinarily carried out at a temperature between 60° and 100° C., the optimum temperature being about 80° C. At the temperatures of 60° to 100° C., the copolymerization usually is substantially completed in about 18 to 120 hours, the optimum being from 40 to 60 hours.

The copolymerization of propylene oxide and the selected alkylene sulfide may also be carried out in a suitable inert non-aqueous diluent medium. The employment of such a medium for the polymerization may sometimes tend to reduce the rate of the reaction, although, in certain instances, it may facilitate the achievement of a more nearly complete copolymerization of the monomers. The medium either may be a solvent or a non-solvent suspending medium. It is advantageous for the diluent medium that is employed to boil at about the desired polymerization temperature. In this way, the utilization of reflux techniques permits an easy means for the regulation of the reaction temperature. Diethyl ether, diisopropyl ether, petroleum ether, benzene, n-hexane and the like provide beneficial solvent characteristics for employment in the copolymerization. While various low boiling, liquid, non-solvent media may also be employed, it is usually more desirable to utilize solvents. The inert non-aqueous diluent medium may generally be used in a quantity that is approximately equal to the quantity of the monomers being copolymerized.

Several procedures may be used for the recovery and purification of the copolymerized product from the reaction mass. For example, the unreacted monomers and the solvent or other diluent medium (when one has been employed) may be stripped from the reaction mass by vaporization to leave the catalyst-containing copolymeric material. The crude copolymer is in the form of a resilient solid mass having a brownish to blackish coloration and may be associated with liquid polymers that may have been formed during the reaction. Usually the impure solid copolymer may be dissolved in a suitable solvent, such as hot acetone, which may then be acidified with a hydrohalic or other suitable acid to convert the iron-containing catalyst to a soluble salt form before precipitating the solid polymer by crystallization from the solution at a low temperature, generally about −20° C. or below. Recrystallization may be employed for further purification until a suitable solid copolymeric material is obtained that has a sufficiently high molecular weight to not soften excepting at temperatures that are in excess of about 60° C. Alternatively, water may be added to the acetone solution of the crude polymer from the reaction mass in order to precipitate the iron as a hydroxide which may be removed by filtration before precipitation of the purified copolymeric material.

While the solid copolymers of propylene oxide and alkylene sulfide have a much better stability to heat and light than the homopolymer or other copolymers of propylene oxide, it is generally preferred to incorporate in the copolymer a small proportion of a conventional phenolic or aromatic amine antioxidant of the type used for stabilizing rubber. Among the stabilizers which have been used satisfactorily are such phenols as 4,4'-isopropylidene diphenol (Bisphenol A), 4,4'-isopropylidene di-o-cresol (Bisphenol C), 4,4'-isopropylidene di(o-isopropyl phenol) (Bisphenol G), 2,2'-dihydroxy 4,4'-dichlorodiphenylmethane, hydroquinone monobenzyl ether (Agerite alba), 2,6-ditertiary butyl-4-methyl phenol (Ionol), 2,2-methylene bis(4-methyl-6-tertiary butyl phenol) (Antioxidant 2246), N-p-hydroxy phenyl morphonile (Solux), various aryl oxy ketones (Flectol White) and condensation products of beta naphthol with organic bases (Albasan). Also used have been such aromatic amines as sym. di-betanaphthyl-para-phenylene diamine (Agerite White), phenyl beta naphthal-amine (Agerite powder and Neozine D), polymerized trimethyl dihydroquinoline (Agerite Resin D), Ketone-diamine condensates (Aminox), and condensates of aniline and acetone (Flectol). The antioxidant is usually added in a proportion from 0.5 to 2 percent by weight of the solid polymer. It is most conveniently introduced by mechanically mixing it into the solid resin. It may also be incorporated during the purification treatment by dissolving the antioxidant in the solvent from which the solid propylene oxide resin is being recrystallized. Another procedure is to mix the stabilizer into the resin immediately after recrystallization, while it is still softened with solvent.

The following examples further illustrate the invention but are not to be construed as limiting it thereto.

*Example I*

Propylene oxide was copolymerized with an isomeric mixture of butylene sulfides containing approximately 85 percent by weight of 1,2-butylene sulfide, 10 percent isobutylene sulfide and 5 percent of cis and trans 2,3-isobutylene sulfide.

To a stainless steel bomb, 20 grams of propylene oxide, 5 grams of the isomeric mixture of butylene sulfides, and 1 gram of ferric chloride-propylene oxide complex were added. The ferric chloride-propylene oxide complex was prepared, as described in U.S. Patent No. 2,706,181, by adding a limited amount of propylene oxide very gradually to a body of anhydrous ferric chloride till the vigorous exothermic action ceased. Upon addition of the monomers and the catalyst to the bomb, the bomb was inserted in a protective cage on a revolving paddle in an 80° C. water bath. By being attached to the revolving paddle, the bomb was rotated through 360° and the polymerization mass thus agitated. After about 138 hours the bomb was cooled and opened. A black slightly tacky resilient solid copolymer was obtained which weighed 24.6 grams and represented a conversion of 94.4 percent. The crude copolymer was cut into small pieces and dissolved in 200 milliliters of warm acetone. To the acetone solution of the copolymer, sufficient amount of concentrated hydrochloric acid was added to convert the iron in the catalyst to a soluble form. Upon addition of the acid the color of the solution changed from a deep opaque brown to light yellow and was a clear solution. After the addition of the concentrated hydrochloric acid, the solution was cooled to $-20°$ C. and the copolymer precipitated out and was recovered by filtration. The recovered copolymer was washed with acetone and then dried. The purified copolymer was slightly yellow and weighed 5.3 grams which represent a yield of 22.5 percent based upon the crude copolymer obtained. This copolymer had a softening point in the range of 65° C. to 120° C. and finally melted at 130° C. to a clear greenish sticky fluid.

The above run was repeated except that the reaction temperature time was reduced to 65 hours. After the polymerization, 23.9 grams of the crude copolymer were obtained which upon purification yielded 6.9 grams of the yellowish copolymer. This represented a yield of 26.7 percent. The copolymer had a softening point of 65° to 130° C.

The purified copolymer so obtained was molded into a film. This molded film was stretched by applying tension and three-fold elongation was obtained. When the film was stretched to this three-fold limit, it was found to exhibit crystalline orientation in the plane of the film, the crystallites being oriented into the direction of the stretching. The film had a tensile strength of 10,000 pounds per square inch after the orientation.

*Example II*

In a manner similar to that described in Example I propylene oxide was copolymerized with the isomeric mixture of butylene sulfides in proportions of 90 percent by weight of propylene oxide to the 10 percent by weight of butylene sulfide.

To the stainless steel bomb, 22.5 grams of propylene oxide, 2.5 grams of the isomeric mixture of butylene sulfide, and 1 gram of the ferric chloride-propylene oxide complex were added. This mixture was copolymerized in a manner described in Example I except that a reaction time of 40 hours was used. The crude copolymer obtained weighed 18 grams which represented a 72 percent conversion. Upon purifying the crude copolymer in a manner similar to that described above, 7.8 grams of solid copolymer were obtained. The copolymer so obtained was molded into a film in a manner described in Example I and upon orientation had a tensile strength of 5500 pounds per square inch. This film exhibited superior stability when exposed to heat and light at room temperature and showed no signs of decomposition or increase in hardness six months later although no stabilizer was added.

*Example III*

To a stainless steel bomb, 20 grams of propylene oxide, 5 grams of styrene sulfide, and 1 gram of the ferric chloride-propylene oxide catalyst were added. The propylene oxide and styrene sulfide were copolymerized at 80° C. in a manner described in Example I. The reaction time of 44 hours was used. The amount of crude copolymer obtained was 12.4 grams which upon purification in a manner described in Example I gave 6 grams of the purified copolymer. The purified copolymer had a slight yellowish color, was flexible and upon molding into a film had a tensile strength of 6300 pounds per square inch upon orientation.

In a manner similar to that above, propylene oxide may be copolymerized with ethylene sulfide and propylene sulfide by substituting the respective alkylene sulfide in place of styrene sulfide.

What is claimed is:
1. A solid polymeric composition having an average molecular weight over 100,000 and a softening point above 60° C. which comprises propylene oxide copolymerized with an alkylene sulfide selected from the group consisting of ethylene sulfide, propylene sulfide, isobutylene sulfide, 1,2-butylene sulfide, 2,3-butylene sulfide, styrene sulfide, and mixtures thereof, containing in combined form from 5 to 95 weight percent of propylene oxide and the remainder the alkylene sulfide.

2. A solid polymeric composition having an average molecular weight over 100,000 and a softening point above 60° C. which comprises propylene oxide copolymerized with an alkylene sulfide selected from the group consisting of ethylene sulfide, propylene sulfide, isobutylene sulfide, 1,2-butylene sulfide, 2,3-butylene sulfide, styrene sulfide, and mixtures thereof, containing in combined form from 80 to 90 percent of propylene oxide and the remainder the alkylene sulfide.

3. A composition according to claim 2 where the alkylene sulfide is butylene sulfide.

4. A composition according to claim 2 wherein the alkylene sulfide is styrene sulfide.

5. A process for the preparation of a solid polymeric resin of propylene oxide and an alkylene sulfide, which comprises mixing propylene oxide with an alkylene sulfide selected from the group consisting of ethylene sulfide, propylene sulfide, isobutylene sulfide, 1,2-butylene sulfide, 2,3-butylene sulfide, styrene sulfide and mixtures thereof in the presence of from 1 to 6 weight percent, based upon the weight of the monomers, of a ferric chloride-propylene oxide complex catalyst containing approximately 2 to 3 moles of combined propylene oxide per mole to combined ferric chloride, said propylene oxide and alkylene sulfide being mixed in amounts of from 5 to 95 weight percent propylene oxide and the remainder alkylene sulfide, heating the resulting mixture to a temperature of 30° to 150° C. for a period of time sufficient to copolymerized substantially all of the propylene oxide and alkylene sulfide, and separating the solid copolymer from the copolymerized mixture.

6. A process according to claim 5 wherein the resulting mixture is heated to a temperature of 60° to 100° C. for a period of time of from 3 to 200 hours.

7. A process according to claim 6 wherein the resulting mixture is heated for a period of time of from 18 to 120 hours.

8. A process according to claim 7 wherein the alkylene sulfide is 1,2-butylene sulfide.

9. A process according to claim 7 wherein the alkylene sulfide is styrene sulfide.

10. A process for the preparation of a solid polymeric resin of propylene oxide and 1,2-butylene sulfide, which comprises mixing propylene oxide with 1,2-butylene sulfide, in amounts of from 80 to 90 weight percent of propylene oxide and the remainder 1,2-butylene sulfide, in the presence of 4 weight percent, based upon the weight of the monomers, of a ferric chloride-propylene oxide complex catalyst containing approximately 2 to 3 moles of combined propylene oxide per mole of combined ferric chloride, heating the resulting mixture to a temperature of 80° C. for from 40 to 60 hours, and separating the solid copolymer from the copolymerized mixture.

References Cited in the file of this patent

UNITED STATES PATENTS

| | | |
|---|---|---|
| 2,484,370 | Ballard et al | Oct. 11, 1949 |
| 2,706,189 | Pruitt et al. | Apr. 12, 1955 |